United States Patent Office 3,480,193
Patented Nov. 25, 1969

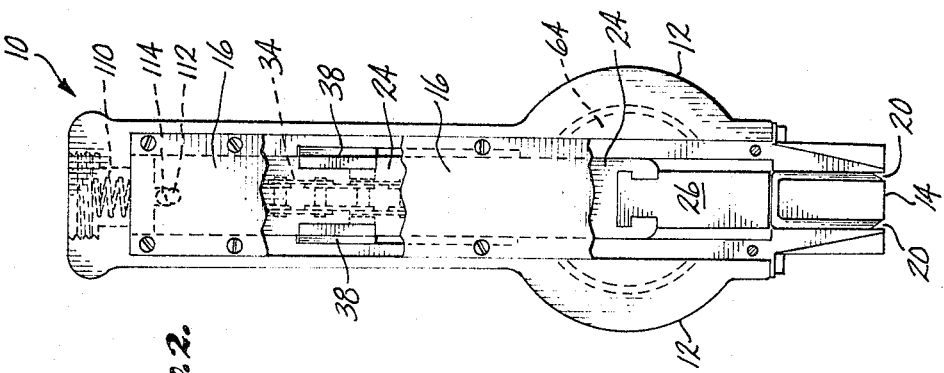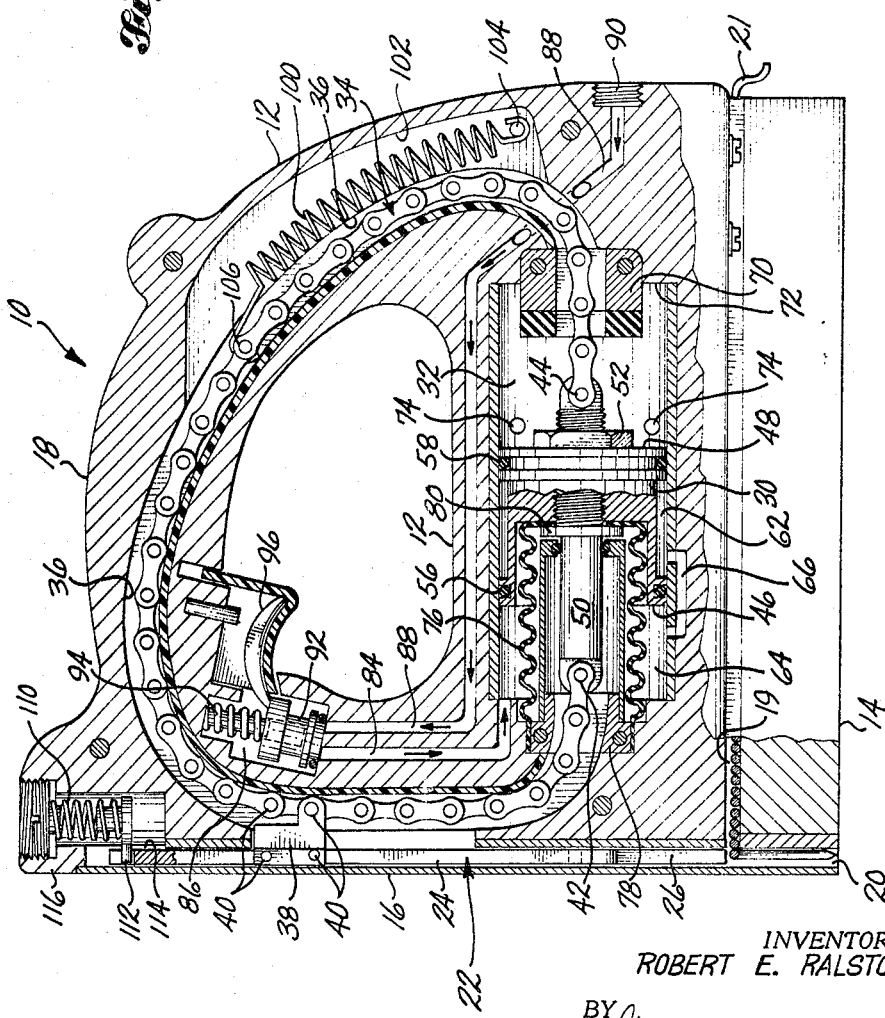

3,480,193
POWER-OPERABLE FASTENER APPLYING
DEVICE
Robert E. Ralston, 11808 44th Place S.,
Seattle, Wash. 98178
Filed Sept. 15, 1967, Ser. No. 668,231
Int. Cl. B27f 7/22
U.S. Cl. 227—130                           11 Claims

ABSTRACT OF THE DISCLOSURE

A pneumatically-operable fastener applying device comprising a casing which houses a fastener storage chamber containing a supply of fasteners (e.g. staples or nails), a fastener driving blade reciprocally mounted above the fastener storage chamber for driving fasteners out of the storage chamber and into a piece of work, a pneumatically-operable piston for propelling the fastener driving blade through its fastener applying stroke, and a flexible band member (e.g. a roller link chain) for delivering motive power from the piston to the fastener driving blade. The band member courses a generally arcuate channel in the housing, has its opposite ends connected to the oppositely facing surfaces of the piston and is operatively connected to the fastener driving member. By virtue of this construction, the piston is centrally loaded and not subject to a twisting torque, and the fastener driving blade is nonetheless disposed to permit the mechanism to be used for applying fasteners to a work surface close by a wall or the like.

BACKGROUND OF THE INVENTION

The present invention relates to improvements in power-operable fastener applying device, such as nailers, staplers and the like.

Several types of hand-held fastener applying devices have been designed which incorporate pnuematic, electromagnetic or other power-operable means for driving the fasteners into the work. Typically, such a device comprises a casing which houses a fastener storage chamber, a fastener driving blade reciprocally mounted adjacent the storage chamber for driving fasteners out of the storage chamber and into the work, and a power-operable mechanism (e.g. a pneumatic piston-and-cylinder arrangement) for driving the fastener driving blade through its fastener applying stroke. Such a device is shown, for example, in Hoeflich U.S. Patent No. 2,682,658.

One disadvantage associated with fastener applying mechanisms of the type shown in the Hoeflich patent is that the pneumatic piston protrudes forwardly beyond the fastener driving blade and prevents the mechanism from being effectively employed to apply fasteners to the edge of a surface which is located directly adjacent to a surface forming a right angle with it (e.g. the edge of a floor next to a wall).

In an effort to overcome the foregoing disadvantage, power operable fastener applying devices have been designed so that the forward edge of the power driven piston is substantially flush with the fastener driving blade. Such devices are shown, for example, in Juilfs U.S. Patent No. 2,585,942, Leibowitz U.S. Patent No. 2,652,563, Jenny U.S. Patent No. 2,714,208, and Kahn U.S. Patent No. 3,049,712. However, the offset nature of the fastener driving blade relative to the power driven piston subjects the driving blade and piston to a twisting torque which may eventually result in undue drag and wear on the piston and in bending or fracture of the blade and/or the piston.

SUMMARY OF THE INVENTION

In view of the foregoing, it is an object of the present invention to provide a power-operable fastener applying device of the general type discussed above wherein the power-driven piston does not extend forwardly beyond the fastener driving member and yet is centrally-loaded during its power stroke.

A further object of the present invention is to provide a power-operable fastener applying device wherein power is delivered from the power-operable mechanism to the fastener driving member through a generally elongated, flexible band member.

The foregoing objects have been realized by the fastener applying device of the present invention which employs a flexible elongated band member (e.g. a roller-link chain) for delivering motive power from the power-operable mechanism (e.g. pneumatic piston) to the fastener driving blade. The flexible band member is typically disposed in a generally arcuate channel in the housing, has its opposite ends connected to the oppositely facing surfaces of the piston to form a closed loop power transfer mechanism. In the forward portion of the device the flexible band channel lies near the external surface of the device and the fastener driving blade is interconnected with the band at this location so as to be disposed near-edge of the mechanism.

Other objects, features and advantages of the present invention will become apparent from the following detailed description of a preferred embodiment thereof.

BRIEF DESCRIPTION OF THE DRAWINGS

In the drawings:

FIG. 1 is a sectional, side elevation view of a pneumatically-operated stapler constructed in accordance with the teachings of the present invention; and FIG. 2 is a front end elevation view of the stapler shown in FIG. 1.

DETAILED DESCRIPTION OF PREFERRED EMBODIMENT

While the fastener applying mechanism shown in the drawings and described hereinafter is a pneumatically-operable stapler, it is to be understood that the power transfer arrangement of the present invention is equally applicable to other fastener applying mechanisms (e.g. a nailer, tacker or stud gun), and to such mechanisms whether pneumatically operated or operated by any other power medium (e.g. hydraulic or electromagnetic).

The stapler 10 shown in the drawings comprises a housing 12 having a work contacting surface 14, a forward surface 16 and a handle portion 18. In a manner conventional per se, a staple storage chamber 19 is provided in the housing 12 adjacent the work contacting surface 14 thereof and communicates with a staple ejection opening 20 cut in the surface 14 adjacent its forward end. A spring tensioner mechanism 21 is provided in the rear portion of the staple storage chamber 19 and biases the staples therein toward the staple ejection opening 20. A staple driving member 22 comprising an upper portion 24 and a lower blade 26 is slidably mounted in the housing 12 adjacent the forward surface 16 thereof for driving staples, one-at-a-time, through the opening 20.

The staple driving member 22 is selectively propelled through its staple driving stroke by pneumatically-operable piston 30 disposed in cylinder 32 in the housing 12 rearwardly of its forward surface 16. A roller link chain 34 disposed in a generally arcuate channel 36 in the housing 12 delivers power from the piston 30 to the staple driving member 22 via a pair of connecting links 38, 38 attached to the chain 34 and the driving member 22, as by pins 40. The opposite ends 42, 44 of the chain 34 are connected to the oppositely facing surfaces 46, 48 of the piston 30 by means of a connecting pin 50 which extends longitudinally through the piston and is secured in position by a lock nut 52 at the rearwardly facing piston surface 48.

A pair of O-ring seals 56, 58 are provided around the piston 30 adjacent its ends for preventing leakage between the piston and the wall of chamber 32. The portion of the piston 30 between the O-rings 56, 58 has a lesser diameter than the outer ends to provide an annular chamber 62 between the piston and the wall of chamber 32. This annular chamber 62 communicates with the inlet or forward end 64 of the chamber 32 via an air passage 66 for a purpose which will become apparent hereinafter.

An abutment member 70 is provided in the rear wall 72 of the chamber 32 for limiting rearward movement of the piston during the power stroke. Preferably, the abutment 70 is constructed of rubber or some other suitable cushioning material. Also provided in the rear portion of the chamber 32 are a plurality of circumferentially spaced exhaust ports 74.

An accordion-pleated type dust cover 76, conventional per se, is secured between a tie-down block 78 at the forward end 64 of the piston chamber 32 and an annular plate 80 mounted on the pin 50. The cover 76 expands and contracts longitudinally in the conventional manner as the piston 30 reciprocates in the chamber 32 and functions to prevent foreign matter from entering the forward end of the piston.

The forward end 64 of the piston chamber 32 is connectible to a suitable source of air under pressure (not shown) externally of the housing 12 via a first air passage 84 extending between the piston chamber and a valve chamber 86 and a second air passage 88 extending between the valve chamber 86 and an air hose fitting 90 at the rear portion of the housing. A valve member 92 is disposed in the valve chamber 86 and is spring-biased by a spring 94 to a closed position wherein it blocks communication between the passages 84 and 88. The valve member 92 may be selectively lifted against the bias of spring 94 by a trigger 96 conveniently positioned adjacent the handle portion 18 of the housing 12. When the trigger is lifted, communication between the air passages 84 and 88 is established via the valve chamber 86 and air under pressure may flow through the passages and into the forward end 64 of the piston chamber 32 to drive the piston rearwardly in the chamber.

A return spring 100 is connected between one of the links 106 of the chain 34 and a pin 104 in spring chamber 102 adjacent the rear portion of the housing 12 for returning chain 34, piston 30, and staple driving member 22 to their original positions after each power stroke. A buffer spring 110 is provided in the upper forward end of the housing 12 and functions to cushion or buffer the impact force of the staple driving member 22 during its return stroke. A guide pin 112 is connected to the lower end of the buffer spring 110 and rides in a generally vertical slot 114 in the upper forward surface of the housing 12.

The inner wall of the channel 36 in which the chain 34 reciprocates is preferably lined with a relatively slick, protective material, such as Teflon, to prevent the chain from marring the channel wall as it reciprocates.

In operation, with a suitable air pressure source (not shown) connected to the fitting 90 of the passage 88, when it is desired to drive a staple into a piece of work the work contacting surface 14 of the stapler 10 is positioned on the work with the staple ejection slot 20 overlying the spot where it is desired to apply the staple. Since the piston 30 is disposed in the housing 12 rearwardly of its forward surface 16, the forward end of the stapler may be placed directly adjacent a wall or other surface which might otherwise interfere with the application of a staple to the edge of the work surface. The trigger 96 is then lifted and air under pressure flows through passage 88, valve chamber 86 and passage 84 to the forward end 64 of the piston chamber 32. The pressurized air forces the piston 30 rearwardly in the chamber 32, and the chain 34 connected to the piston is driven in a counterclockwise direction (as viewed in FIG. 1).

The connecting links 38, driven downwardly by the chain 34, in turn drive the staple driving member downwardly to force the forward-most staple in the storage chamber 19 through the staple ejection slot 20 and into the work. When the piston 30 reaches its rearward position in the chamber 32, the forward end 64 of the chamber and the passage 84 between it and the valve chamber 86 communicates with the atmosphere via the passage 66, the annular chamber 62 and the exhaust ports 74.

When the operator releases the trigger 96, spring 94 returns valve 92 to its closed position, and return spring 100 pulls the chain in a clockwise direction to return it, the piston 30, and the staple driving member 22 to their initial or at-rest positions. Buffer spring 110 cushions the return force of the driving member 22.

While the present invention has been shown and described herein simply in terms of a preferred embodiment, it is to be understood that various modifications may be made without departing from the spirit and scope of the invention. For example, while the flexible band for delivering motive power from the drive piston to the staple driving blade has been shown in the preferred embodiment as a roller link chain, it will be understood that other elongated, flexible band members, such as a cable or steel band on rollers, for example, may be employed. Accordingly, it is intended that the invention be limited only by the scope of the following claims.

What is claimed is:

1. In a fastener applying mechanism comprising a housing and a fastener driver member along one side of and reciprocally mounted in said housing for driving a fastener into a work piece, improved means for selectively moving said driver member through its fastener applying stroke; said improved means comprising:

means defining a generally curvilinear band receiving channel in said housing;

a generally elongated, flexible band member disposed in said channel; said band member having opposite ends;

power operable means disposed between and symmetrically interconnected with said opposite ends of said band member for selectively moving said band member through a generally arcuate path in said band receiving channel; and force delivering means attached to said band member and operatively associated with said fastener driver member for propelling said driver member through a fastener applying stroke when said power operable means is actuated to cause movement of said band member.

2. The combination according to claim 1, and further including spring means connected to said flexible band member for effecting return movement of said piston, said band member and said fastener driver member following movement of said driver member through its said fastener applying stroke.

3. The combination according to claim 1, wherein said generally elongated, flexible band member comprises a roller-link chain.

4. The combination according to claim 1, wherein said housing includes a forward surface, and said fastener driver member is reciprocally mounted adjacent said forward housing surface; and wherein said power operable means comprises means defining a piston chamber in said housing rearwardly of said fastener driver member, a fluid-operable piston reciprocally mounted in said piston chamber, and means for selectively delivering fluid under pressure to one end of said piston chamber; said fluid operable piston being connected between said opposite ends of said flexible band member.

5. The combination according to claim 4, and further including means for selectively connecting said housing to a source of fluid under pressure; and wherein said means for selectively delivering fluid under pressure to one end of said piston chamber comprises means defining a fluid passage between said one end of said chamber and said means for connecting said housing to a source of fluid under pressure, and manually operable valve means disposed in said fluid passage for selectively establishing communication between the fluid source and said piston chamber.

6. The combination according to claim 4, wherein said fluid operable piston means comprises a pneumatically-operable piston.

7. The combination according to claim 1, wherein said force delivering means comprises connecting link means attached to said fastener driving member.

8. A mechanism for applying fasteners to a workpiece, comprising:
a housing including a work contacting surface adapted to rest against the workpiece to which fasteners are to be applied, and a forward surface generally perpendicularly related to said work contacting surface;
means defining a fastener outlet opening in said work contacting surface adjacent said forward surface;
means defining a fastener storage chamber in said housing communicating with said fastener outlet opening;
a fastener driver member mounted in said housing for reciprocating movement in a plane adjacent to and substantially parallel to said forward surface of said housing;
means normally maintaining said fastener driven member in a retracted position spaced from said fastener outlet opening; and
fluid operable means disposed in said housing for selectively propelling said driver member into said fastener storage chamber to drive a fastener through said fastener outlet opening; said fluid operable means comprising:
means defining a piston chamber in said housing having one end adapted to be connected to a source of fluid under pressure;
valve means for controlling the admission of fluid under pressure to said cylinder; and
a piston reciprocably mounted in said piston chamber;
means defining a generally arcuate band receiving channel in said housing;
a generally elongated, flexible band member disposed in said channel and including opposite ends connected to said piston, whereby linear movement of said piston in said cylinder will cause generally arcuate movement of said band member in said channel; and
a force delivering member attached to said flexible band member and operatively associated with said fastener driver member for propelling said driver member into said storage chamber when said valve means is operated to admit fluid under pressure to said piston chamber.

9. In a fastener applying mechanism comprising a housing, a fastener supply compartment, a fastener driving member arranged for reciprocation perpendicularly of said fastener supply compartment, and power driven means connected to said fastener driving member and selectively operable to move said fastener driving member through a driving stroke; the improvement wherein said fastener driving member is arranged to move in a path close by a side of said housing and said power driven means comprises a power reciprocable member in another portion of said housing and having flexible band means axially interconnecting the ends of said power reciprocable member and forming a closed loop therewith the said flexible band means being arranged for reciprocable movement in generally curvilinear channel means within the housing and in part passing close by and being connected to said fastener driving member.

10. A mechanism according to claim 9, wherein said housing is configured to have a generally central opening and a hand grip overlying the said central opening, and said generally curvilinear channel means in part lies within the hand grip portion of said housing.

11. A mechanism according to claim 9, wherein the band engaged surface of said channel means is fabricated of low friction plastic.

References Cited

UNITED STATES PATENTS

| | | |
|---|---|---|
| 2,234,808 | 3/1941 | Schafroth. |
| 2,775,765 | 1/1957 | Klopstock _____ 227—132 |

GRANVILLE Y. CUSTER, JR., Primary Examiner